US007628261B2

(12) United States Patent
Gierer et al.

(10) Patent No.: US 7,628,261 B2
(45) Date of Patent: Dec. 8, 2009

(54) APPARATUS FOR THE OPERATION OF A HYDRODYNAMIC TORQUE CONVERTER AND A THEREWITH CORRESPONDING CONVERTER BYPASSING CLUTCH OF A TRANSMISSION APPARATUS

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 354 days.

(21) Appl. No.: 11/704,581

(22) Filed: Feb. 9, 2007

(65) Prior Publication Data
US 2007/0187203 A1 Aug. 16, 2007

(30) Foreign Application Priority Data
Feb. 10, 2006 (DE) .................. 10 2006 006 180

(51) Int. Cl.
*F16H 61/14* (2006.01)
(52) U.S. Cl. ........................ 192/3.3; 192/3.33
(58) Field of Classification Search ................ 192/3.29, 192/3.3, 3.33, 732.1
See application file for complete search history.

(56) References Cited

U.S. PATENT DOCUMENTS

| | | | | | |
|---|---|---|---|---|---|
| 4,466,311 | A | * | 8/1984 | Hiramatsu | 477/169 |
| 4,880,090 | A | * | 11/1989 | Ando | 192/3.3 |
| 4,966,263 | A | * | 10/1990 | Hayasaki | 192/3.3 |
| 5,115,897 | A | * | 5/1992 | Yoshimura et al. | 477/65 |
| 6,374,973 | B1 | * | 4/2002 | Nobu et al. | 192/3.3 |
| 6,474,456 | B2 | * | 11/2002 | Suzuki et al. | 192/3.29 |
| 6,544,139 | B1 | | 4/2003 | Gierer et al. | |
| 7,100,753 | B1 | * | 9/2006 | Stafford | 192/3.3 |
| 2008/0173508 | A1 | * | 7/2008 | Gierer et al. | 192/3.3 |

FOREIGN PATENT DOCUMENTS

| DE | 10 2004 024 379 | 3/1999 |
|---|---|---|
| DE | 198 58 541 A1 | 6/2000 |
| DE | 199 10 049 A1 | 5/2004 |
| DE | 10 2005 016 495 A1 | 10/2006 |

OTHER PUBLICATIONS

"Elektrohydraulische Steuerung und äußere Schaltung des automatischen Getriebes W5A 330/580 von Mercedes-Benz", *Automobiltechnischen Zeitschrift 97 (1995)*, Nr. 10, pp. 698-706.

* cited by examiner

*Primary Examiner*—Rodney H Bonck
*Assistant Examiner*—Justin Holmes
(74) *Attorney, Agent, or Firm*—Davis & Bujold, P.L.L.C.

(57) ABSTRACT

An apparatus operating a hydrodynamic torque converter and a corresponding converter-bypass clutch of a transmission. The apparatus having a line system, a solenoid valve and a therewith coacting variable pressure controlling valve. A valve stem assembly respectively of the solenoid valve and the pressure control valve are controllable by subjection to a pilot pressure counter to a spring arrangement. A spent flow of the torque converter is, by way of a piston chamber of the converter-bypass clutch, which chamber is subjected to hydraulic fluid pressure of the spent flow of the torque converter, by means of an operational pressure aperture valve and a relief control aperture valve of the pressure control valve, connectable to a spent flow control aperture valve of the solenoid valve. By way of the piston chamber, this spent flow communicates with the hydraulic system through the spent flow control aperture valve of the solenoid valve.

11 Claims, 5 Drawing Sheets

APPARATUS FOR THE OPERATION OF A HYDRODYNAMIC TORQUE CONVERTER AND A THEREWITH CORRESPONDING CONVERTER BYPASSING CLUTCH OF A TRANSMISSION APPARATUS

This application claims priority from German Application Serial No. 10 2006 006 180.2 filed Feb. 10, 2006.

FIELD OF THE INVENTION

The invention concerns an apparatus for operating of a hydrodynamic torque converter and a corresponding converter-bypassing clutch of a transmission apparatus.

BACKGROUND OF THE INVENTION

The practice has long been aware that drive trains of vehicles can be designed, utilizing acceleration apparatuses constructed as hydrodynamic torque converters. In order to reduce or to eliminate hydrodynamic loss in the hydrodynamic converter, the concept arose of amplifying the torque converter with a so-called converter-bypass clutch. In the engaged position of a converter-bypass clutch, the situation is, that power transmission in the drive train of a vehicle is diverted around the converter. The transmission of torque is then carried out by way of a connection based on frictional contact, resulting, essentially, in little loss.

Fundamentally, two different system groups (named hereinafter as a "first" system group and a "second" system group) of drive apparatuses, which involve a torque converter and a therewith corresponding converter-bypass clutch, would employ elements and procedures as outlined in the following:

In the case of the first system group, the hydraulic activation of the converter-bypass clutch is integrated in the hydraulic fluid circulation arrangement of the therewith corresponding hydraulic torque converter, such a system is referred to as a "two-line system". A converter clutch piston of a two-line system activates the converter-bypass clutch. The piston is subjected to hydraulic pressure and its active surface is designed as a flexible disk, the hub of which is rotationally fixed with a turbine of the hydrodynamic torque converter.

Should the converter-bypass clutch be in disengaged state, the converter clutch piston is subjected to pressurizing hydraulic oil flow emerging from the inlet side of the hydrodynamic converter wherein the flow proceeds toward the outlet side of the same. To engage the converter-bypass clutch, it is necessary that an inlet pressure of the hydrodynamic converter be essentially reduced to zero, i.e., shifted thereto. This will yield the result, that an existing static pressure within the hydrodynamic converter would be accordingly depressurized. The converter clutch piston, the movement of which operates the converter-bypass clutch, is coated with a first friction overlay on that side thereof which is remote from the hydrodynamic converter and, during the above operational condition of the hydrodynamic torque converter, this frictional overlay is pushed by a spring arrangement, associated with the converter clutch piston, against the housing of the pump side of the hydrodynamic torque converter.

In order to enhance the capability of the converter-bypass clutch for power transmission and simultaneously to increase the torque carried thereby, an inlet pressure of the same is increased. Raising the level of the inlet pressure of the converter-bypass clutch also increases the pressure of this coated clutch against the housing of the pump side of the hydrodynamic torque converter. Additionally, in a case of an engaged converter-bypass clutch, the converter clutch piston decreases the flow of oil through the hydrodynamic torque converter to a predetermined minimum, such that the converter clutch piston of the converter-bypass clutch essentially assumes the function of a conventional hydraulic check valve.

In order to avoid diminishment of driving comfort, the converter-bypass clutch is advantageously placed in the engaged position especially at a time when the drive train perceives rotational deviations of the internal combustion motor which drives the drive train. Consequently, these deviations cause an audible noise to be heard by the driver. During a period of acceleration, to inhibit this disadvantage, an effort is made to engage as quickly as possible the converter-bypass clutch for the reduction of the hydraulic loss tendency occurring in the hydrodynamic torque converter when the converter-bypass clutch is disengaged.

DE 198 58 541 A1 makes known an electronic-hydraulic control apparatus of an automatically shifted motor vehicle, which includes an arrangement for operating an existing two-line converter designed as a first system group. That is to say, this would be a hydrodynamic torque converter and a corresponding converter by-pass clutch.

DE 10 2005 016 495.1 likewise teaches of a hydraulic control system for a two-line converter which exhibits by-need-only activation of a two-line converter having a solenoid valve with a pressure control valve acting therewith. A control system of the cited invention is assembled with a solenoid valve and a variable pressure control valve operationally connected thereto, wherein the valve disk thereof is designed with pressure reactant surfaces. The result thereof allows a pilot pressure to be controllingly placed in opposition to a spring arrangement.

Additionally, the solenoid valve and the pressure control valve are equipped with a plurality of inlet or outlet control valves (hereinafter designated as "aperture control valves"). These aperture control valves are bound with control lines which supply hydraulic fluid pressure to the torque converter and to the converter bypass clutch. This supplied pressure acts against the remote end faces of the aperture control valve mechanism and the control lines can be subsequently connected with both the torque converter and the converter-bypass clutch. A supply pressure aperture control valve of the solenoid valve, which is subjected to pressure, can be brought into a working connection with an operational pressure aperture control valve of the solenoid valve, which latter aperture control valve. The operational pressure aperture control valve is in communication with the inlet side of the torque converter.

Further, the solenoid valve has a control space, which can be brought into connection with a supply aperture control valve. There is a difference in surface areas between pressure responsive surfaces within the solenoid valve itself; the surfaces being proximal to the control space. This effective difference in surface areas control the flow through the torque converter when the converter-bypass clutch is disengaged.

In *ATZ Automobiltechnische Zeitschrift* 97 (1995), no. 10, pp. 698 to 706, an article entitled "Electrohydraulic Control and External Shifting of the Automatic Transmission W5A 330/580 of Mercedes Benz" discloses an apparatus for the operation of a hydrodynamic torque converter with a corresponding converter-bypass clutch. The discrete operation of the converter-bypass clutch is based on the hydraulic fluid circulation system of the torque converter. The piston chamber of the converter-bypass clutch is subjected to pressure from a control line, which is separated from the hydraulic fluid through-put zone of the torque converter. The control line uses that pressure which is necessary for the activation of the converter-bypass clutch, while the converter-bypass clutch, as in a two-line converter, is spatially integrated within the housing of the torque converter. Forward drive apparatuses of this kind have been designated in practice as "three-line converters" and have been classified as a second system group.

By a wide margin, the embodiments for drive apparatuses, known to the practice, possess a torque converter and a therewith corresponding converter-bypass clutch. However, in such embodiments, the clutch is hydraulically activated and is placed separately away from the torque converter. This assembly belongs to the second system group, wherein the converter-bypass clutch can be spatially distanced at an optionally selected position in the drive string of a vehicle. The clutch, in this position, for instance, can be employed as a shifting clutch or alternately as a brake within the housing of a transmission apparatus.

The known devices for the operation of drive apparatuses of the first system group and the known devices for the operation of drive apparatuses of the second system group, possess control lines bound with aperture control valves dedicated to valve functions. These control lines, respectively, by way of hydraulic lines of a hydraulic line system serve the hydrodynamic torque converter and the converter-bypass clutch, so that, at appropriate locations, necessary activation pressures can be adjusted in an operationally, reliable manner.

The described known arrangements, however, have system-related disadvantages, in that its operation in the drive apparatuses, which belong to the first system group and its operation in the in the known drive apparatuses for operation in the second system group, are, in general, carried out in different ways, so that the drive apparatuses of one system cannot be operated with apparatuses, which have been provided for the activation of drive apparatuses of the respective other system. This is, in any case, undesirable, since in the area of the transmission control no cost effective, standardized component group can be applied.

With consideration of the above situations, the invention has the purpose of making available an apparatus for the operation of a hydrodynamic torque converter and a therewith corresponding converter-bypass clutch, by way of which both drive apparatuses of the first system as well as the second system can be operated in the same manner. Further, in the invented arrangement, at least partially, one, standardized construction component group, which is independent of a system group can be used.

SUMMARY OF THE INVENTION

The apparatus, according to the invention, for the operation of a hydrodynamic torque converter and a therewith corresponding converter-bypass clutch of a transmission device is designed with a line system having a solenoid valve and a therewith corresponding, variable pressure control valve, whereby the valve stem assembly of the solenoid valve and that of the pressure control valve are controllable by a pilot pressure acting against a spring force. Additionally, The solenoid valve and the pressure control valve are equipped with a plurality of aperture control valves, which in turn are connected to corresponding control lines. These serve for the application of pressurized hydraulic fluid to the torque converter and to the converter bypass clutch. The points of application are the remote ends of the aperture control valves at hydraulic lines of a hydraulic line system, the connections of which are located at an inlet and an outlet side of the torque converter as well as a receiving piston chamber of the converter-bypass clutch.

In accord with the invention, connections can be made for utilizing the spent flow from the torque converter. These connections are achieved to subject a receptive pressure space of the converter-bypass clutch piston with hydraulic fluid from the spent flow of the torque converter. The connections for this service can be made in the hydraulic-line system by an operational aperture control valve and a relief aperture control valve of the pressure control valve, which aperture control valves can be brought into connection with a spent flow aperture control valve of the solenoid valve. Further, in regard to the spent flow of the torque converter, the separate piston chamber of the converter bypass clutch can be directly connected by the hydraulic system with the spent flow aperture control valve of the solenoid valve.

In this way, the inventive apparatus, at least in an operational manner, exhibits a standardized control and regulation arrangement, which can be installed in the line system without constructive changes in regard to both as an acceleration apparatus of a two-line type as well as to a three-line designed acceleration apparatus of a drive string of a vehicle.

This means, that the component of the line system, which includes both the solenoid valve and the variable pressure control valve can be economically integrated into a hydraulic transmission control apparatus, which can be employed both for the control of a transmission apparatus with a two-line converter combined transmission apparatus as well as for the control of a transmission apparatus with a three-line converter. The system-related, varied connection of the transmission control apparatus to the two-line converter and/or the three-line converter is accomplished in the area of the hydraulic line system of the apparatus, which advantageously, is in an area of the housing of the two-line converter or the three-line converter, which can also be made as a separate housing or as a one-piece construction combined with the housing of the transmission apparatus.

In the case of the inventive apparatus, the entire manufacturing cost of a transmission apparatus of a first or second system group mode, can be reduced in a simple manner from the known transmission apparatuses constructed in the mode of the state of the technology. This is true, since design changes in the hydraulic control system of one known transmission apparatus and those changes ascribed to one of the above described known acceleration apparatuses are respectively retained in separate areas, wherein, because of the difference in functionality of the drive apparatuses, they differ from one another and on this account cannot be standardized.

BRIEF DESCRIPTION OF THE DRAWINGS

The invention will now be described, by way of example, with reference to the accompanying drawings. In the description, the various embodiment examples, for the sake of clarity, employ the same reference numbers for components of like functionality. There is shown in.

DETAILED DESCRIPTION OF THE INVENTION

Figure 1:
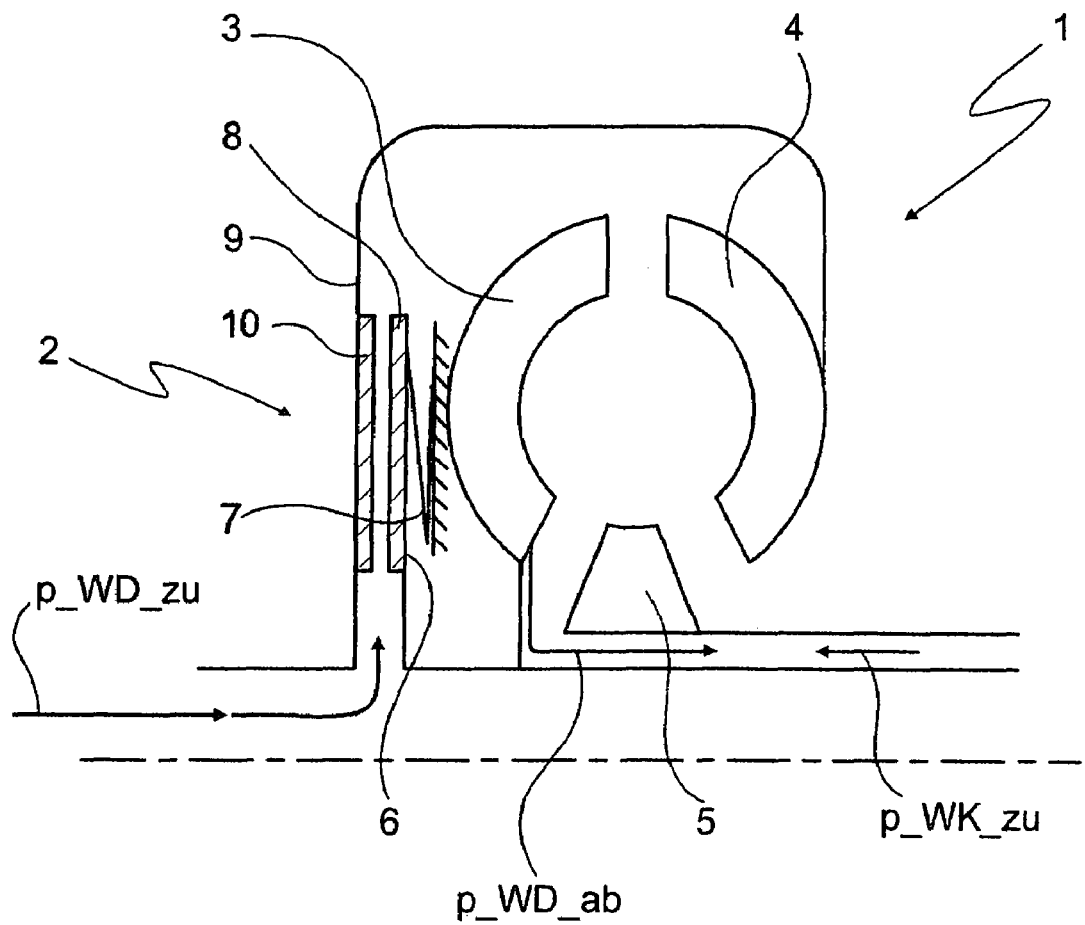
FIG. 1 is a very schematic presentation of a completed drive apparatus serving as a two-line converter in the drive train of a vehicle.

In FIG. 1 is a very schematic presentation of a hydrodynamic torque converter 1 with a controlled converter-bypass clutch 2, which is designed in a known manner with a turbine rotor 3, a pump rotor 4 and a stator 5. Further, a converter clutch piston 6 is provided, which is connected turn-fast with the turbine rotor 3. Additionally, the converter clutch piston 6 is designed to be slidably movable in an axial direction with reference to the pump rotor 4. In place also is a spring apparatus 7, which engages itself with the converter clutch piston 6 and also acts in the engaging direction of the converter-bypass clutch 2. Due to this arrangement, an axial position of the converter clutch piston 6, relative to the spring apparatus 7, determines an inlet pressure p_WD_zu to the torque converter and an input pressure p_WK_zu to the converter-bypass clutch. This determination allows a single resultant from these three force components, which is applied as a total force component against the converter clutch piston 6.

Figure 2:
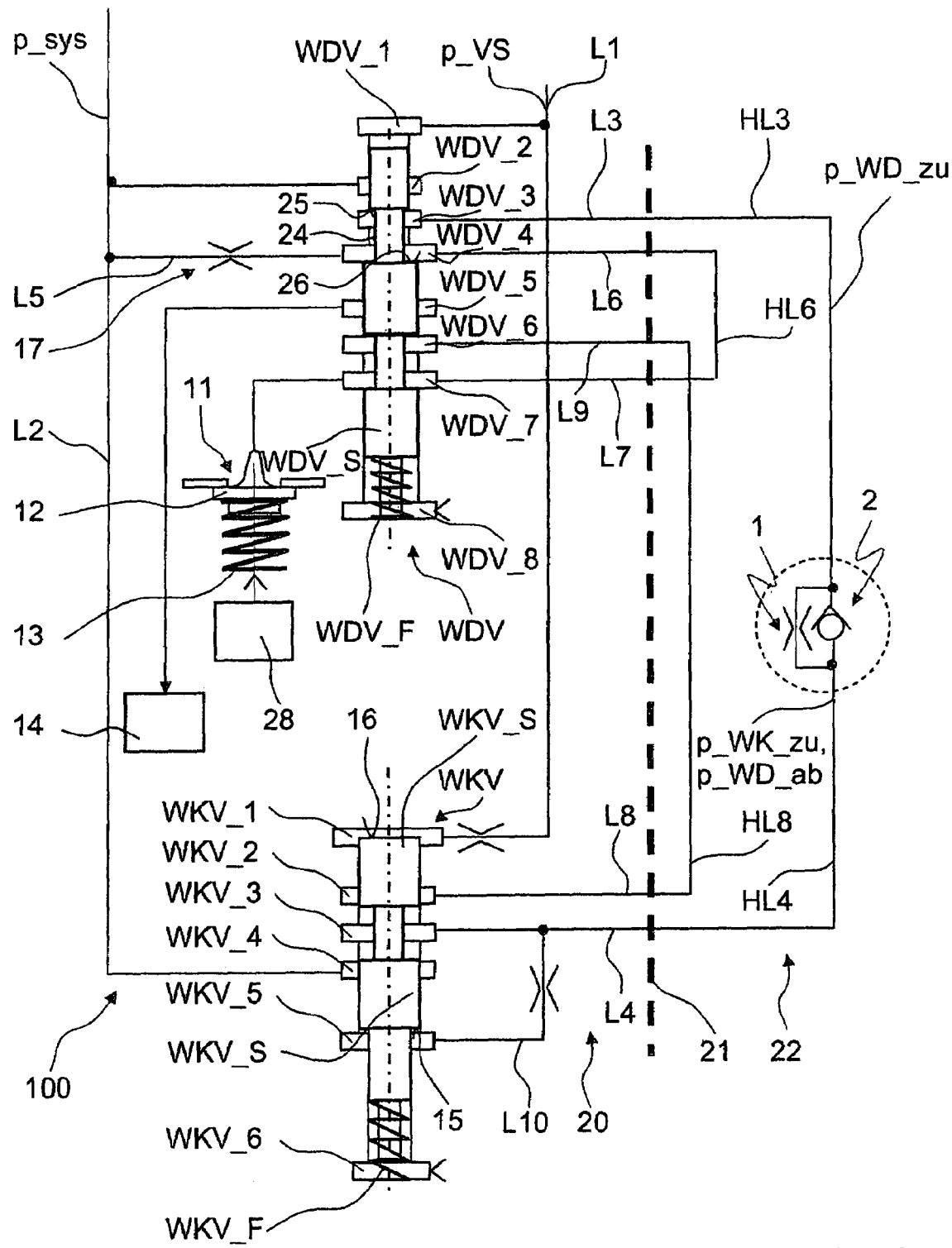
FIG. 2 is a very schematic outline diagram of the inventive apparatus, by way of which a two-line converter can be operated.

The converter clutch piston 6 is constructed with a first friction layer 8 on that side, which is remote from the turbine rotor 3. In a case of a converter-bypass clutch 2 which is in an engaged state, that friction layer equipped side has been moved to contact a second friction layer 10 which is affixed to a housing 9. The result of this is that the pump rotor 4 is now rotationally fixed with the housing 9. Conversely to this arrangement, the converter clutch piston 6, in a case of the disengaged converter-bypass clutch 2, does not lie against the second friction layer 10 of the housing 9. FIG. 2 shows an inventive apparatus 100 with the illustrated solenoid valve WDV which serves for the operation of the torque converter 1 and the converter-bypass clutch 2. Henceforth, the valve WDV can be designated as "converter pressure valve". The torque converter 1, by way of the solenoid valve WDV, which is shown as part of inventive apparatus 100 in FIG. 2, is provided with hydraulic fluid for the operation of torque converter 1 and the converter-bypass clutch 2. In the following, the solenoid valve WDV can be designated as "converter clutch valve". Under these conditions, the hydraulic fluid flows at an inlet pressure p_WD_zu, which pressure was set by the converter pressure valve WDV of the torque converter 1, into the torque converter 1 and leaves at a spent pressure p_WD_ab, this pressure being in accord with a known hydrodynamic ratio established by the torque converter 1 and flows in the direction of the converter clutch valve WKV from the torque converter 1.

The spent pressure p_WD_ab of the torque converter originates from the pressure loss of the flow engendered by the converter pressure valve WDV in the converter and by the resistance to flow caused by the circulation of the transmission cooling and lubrication system.

If inlet pressure p_WD_zu of the torque converter 1 decreases and simultaneously the inlet pressure p_WK_zu of the converter-bypass clutch 2 increases, then, in the torque converter 1 the total resultant force decreases. This resultant force acts on the converter clutch piston 6 and also to disengages the converter-bypass clutch 2 so that, the inlet pressure p_WD_zu of the torque converter 1 drops below a predetermined threshold value and the converter-bypass clutch 2 accordingly engages and the torque converter can no longer be supplied by hydraulic fluid from the converter pressure valve WDV. As this occurs, the converter-bypass clutch 2 engages at an inlet pressure of p_WD_zu of the torque converter 1, which pressure is less than a predetermined pressure value for the inlet pressure p_WK_zu of the converter-bypass clutch. In this state of the operation of the torque converter 1, the total force resultant, which is also engaging the converter-bypass clutch 2, exerts its pressure on the converter clutch piston 6. That is to say, that the force component, which is formed from the spring force of the spring arrangement 7 of the converter-bypass clutch 2 and the inlet pressure p_WK_zu which is being exerted on the converter piston 6 has become greater than the resulting force component of the inlet pressure p_WD_zu of the torque converter 1.

The torque converter 1, which has been designed as a so-called two-line converter and the controlled converter bypass clutch 2 are shown in a very schematic form in FIG. 2. In FIG. 2, these appear as in the form of a throttling element as well as in the form of a check valve. With this arrangement, the hydrodynamic torque converter 1 can be controlled by the converter pressure valve WDV, which pressure valve is equipped with a plurality of aperture control valves, namely WDV_1 to WDV_8, a spring arrangement WDV_F and a valve stem assembly WDV_S. The controlled converter-bypass clutch 2 is controlled by the converter clutch valve WKV, which, likewise, is designed with a plurality of aperture control valves, WKV_1 to WKV_6, a spring arrangement WKV_F and a valve stem assembly WKV_S.

Figure 3:
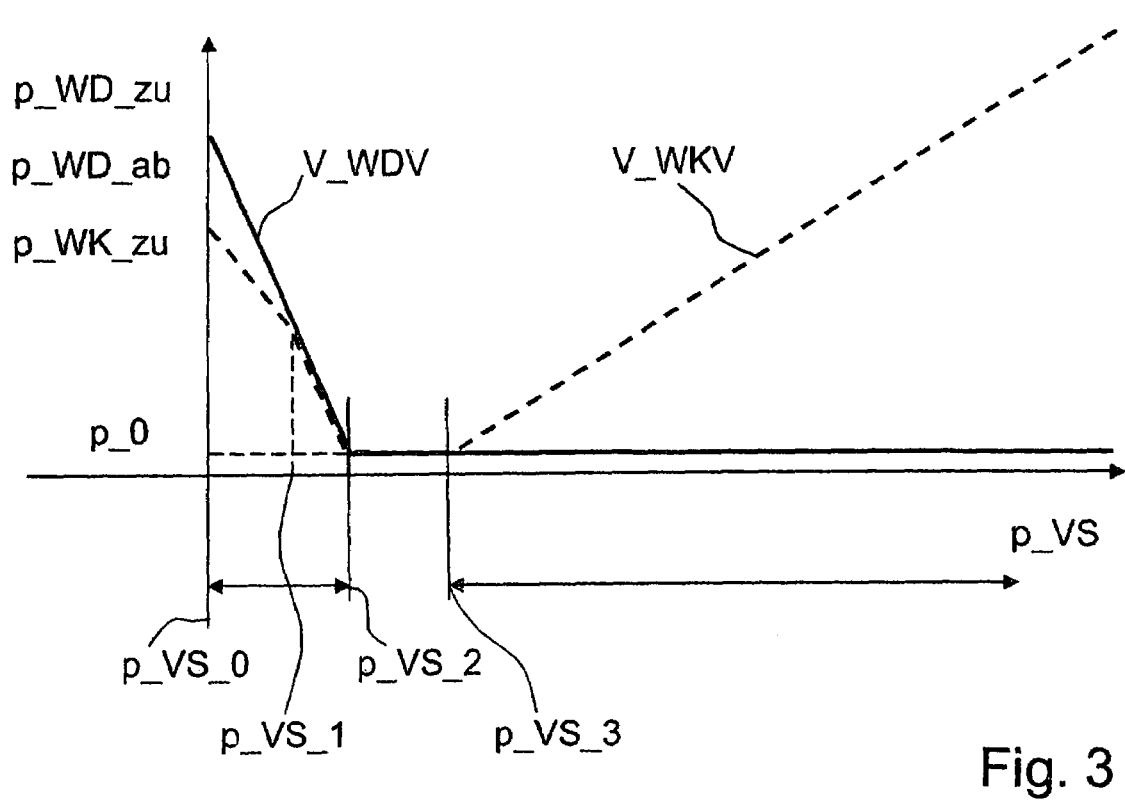
FIG. 3 is a characteristic curve of a solenoid valve and a characteristic curve of a variable pressure control valve of the inventive apparatus according to FIG. 2.

The converter pressure valve WDV and the converter clutch valve WKV are subjected to pressure by the following connection sequence: the pressure is delivered by way of a control line L1 of line system 20, which is placed on that side of the system border line 21 which is proximal to the converter pressure valve WDV and to the converter clutch valve WKV of the shown inventive apparatus 100. The control line L1 obtains its carried pressurized hydraulic fluid from a pressure control valve of a pilot pressure system (which pressure control valve is not described in any detail). This pressure control valve is enhanced by an electrical transmission-control device (not shown) to allow the attainment of the pilot pressure p_VS in a known manner. This pilot pressure p_VS is accordingly applied on the end faces of the valve stem assemblies WDV_S and WKV_S, which are in common connection with respective pilot pressure aperture control valves WDV_1 and WKV_1. This combined pressure now works counter to spring arrangements WDV_F and WKV_F which are connectable through the aperture control valves WDV_8 and WKV_6, which are designated as spring space aperture control valves. Now, considering the combined pressures over the line L1 being exerted on the converter pressure valve WDV and the converter clutch valve WKV, this combined pressure being composed of namely, the existing pilot pressure p_VS, the inlet pressure p_WD_zu of the torque converter 1 and the inlet pressure p_WK_zu of the converter-bypass clutch 2, which total pressure is applied as seen in FIG. 3. Additionally, the inlet pressures p_WD_zu and p_WK_zu, with consideration given to an imposed system pressure p_sys (which system is not more closely described) existing in a control line L2 of the line system 20 and in a valve (not further described), which valve can be regarded as establishing in a known manner a threshold value and controllingly determines the installed system pressure p_sys of the converter pressure valve WDV and the converter clutch valve WKV.

The system pressure p_sys is conducted by way of the control line L2 to a supply aperture control valve WDV_2 of the converter pressure valve WDV. In turn, this valve WDV is bound with the inlet side of the torque converter 1 by a control line L3 of the line system 20 and a hydraulic line HL3 of a hydraulic line system 22 of the inventive apparatus 100. Both of the cited line systems lie on that side of the system border 21 of the apparatus 100, which is remote from the converter pressure valve WDV and from the converter clutch valve WKV. The spent flow of the torque converter 1 is bound to the operational pressure aperture control valve WKV_3 by a hydraulic line HL4 of the hydraulic line system 22 and by a control line L4 of the line system 20.

Additionally, the converter pressure valve WDV is designed with a filling inlet aperture control valve WDV_4, which is subjected to a supply pressure, which has been throttled down from the system pressure p_sys. This connection is made by an additional control line L5, which is shown branching from the control line L2. Line L5 is equipped with a throttle valve 17 for achieving the above mentioned throttling effect. The filling inlet aperture control valve WDV_4 is then connected to a relief aperture control valve WDV_7 of the converter pressure valve WDV. This connection is made through the following succession of connections: first, a control line L6 of the line system 20; second, a connected hydraulic line HL6 of the hydraulic line system 22; and third, a connected control line L7 of the line system 20. The relief aperture valve WDV_7 of the converter pressure valve WDV is connected to an auxiliary pressure control valve 11, by which a predetermined pressure level p_0 cannot be exceeded in the line system 20 nor in the hydraulic line system 22, as this connection is shown in FIG. 2. The auxiliary pressure control valve 11 is designed as a disk valve, which possesses a spring loaded valve disk 12 and a spring arrangement 13 to work against the static pressure in the hydrodynamic torque converter 1.

Moreover, a lubrication and cooling aperture control valve WDV_5 is in communication with a schematically presented lubrication and cooling circulation circuit 14 of a transmission apparatus of the drive train. This connection allows the lubrication and cooling circuit to serve appropriate quantities of lubrication to the components of the transmission and cooling apparatuses, when called for by the positioning of the valve stem assembly WDV_S of the converter pressure valve WDV.

The converter clutch valve WKV, in an appropriate positioning of the valve stem assembly WKV_S, is combined with the relief aperture control valve WKV_2, which can be connected with the operational aperture control valve WKV_3. This operational aperture control valve WKV_2 is bound by a control line L8 of the line system 20 and by a hydraulic line HL_8 which, as shown schematically, merges with the control line L9 in the area of the system border 20, at a spent flow aperture control valve WDV_6 of the converter pressure valve WDV. The spent flow aperture control valve WDV_6 of the converter pressure valve WDV is, during an appropriate positioning of the valve stem assembly WDV_S of the converter pressure valve WDV, connected with the relief aperture control valve WDV_7 of the converter pressure valve WDV, whereby, the hydraulic flow, which is the spent flow of the torque converter 1, is moving in the direction of the converter clutch valve WKV through the line system 20 as well as through the hydraulic line system 22 and again in the line system 20 to a hydraulic fluid reservoir 28 downstream of the auxiliary pressure control valve 11. The fluid reservoir 28 serves also as the oil sump for a transmission apparatus.

If the spent flow aperture control valve WDV_6 of the converter pressure valve WDV is blocked from access to the relief aperture control valve WDV_7 of the same valve WDV, due to valve stem WDV_S positioning but is connected with the lubrication and cooling aperture control valve WDV_5, then, by the flow through the torque converter 1 of hydraulic fluid carried in the direction of the lubrication and cooling fluid circulation system by the following sequence of connections: hydraulic line HL4, the control line L4, the operational pressure aperture control valve WKV_3, the relief aperture control valve WKV_2, the control line L8, the hydraulic line HL8, the control line L9, the spent flow aperture control valve WDV_6 and finally the lubrication and cooling fluid aperture control valve WDV_5, then the hydraulic fluid emerging from torque converter 1 crosses the system border 20 three times between the line system 20 and the hydraulic line system 22.

In the area of the line system 20, between the system limit 21 and the operational aperture control valve WKV_3 of the converter clutch valve WKV, the control line L4 has a tee, wherein an additional control line L10 branches off and subsequently connects to a spent flow aperture control valve WKV_5 of the converter clutch valve WKV. With this connection, the possibility arises, that the spent pressure p_WD_ab following the torque converter 1, which is the inlet pressure p_WK_zu to the converter-bypass clutch 2 in the area of the spent flow aperture control valve WKV_5 can be applied to the pressure control valve WKV at the valve stem assembly WKV_S of the converter clutch valve WKV. This pressure so applied works against the pilot pressure p_VS, active in the areas of the pilot control pressure aperture control valve WKV_1 of the variable pressure controller valve WKV on the valve stem assembly WKV_S of the converter clutch valve WKV. In this way, the spent pressure p_WD_ab from the torque converter 1 which becomes the inlet pressure p_WK_zu of the converter-bypass clutch 2, is easily controllable in a simple manner.

In order to be able to control the inlet flow p_WD_zu to the torque converter, during a period when the converter-bypass clutch 2 is disengaged, the valve stem assembly WDV_S of the converter pressure valve WDV possesses a difference in the effective area between its contiguous active surfaces 25, 26, which respectively lie, in turn, between a control space 24 of the converter pressure valve WDV, and the supply aperture control valve WDV_2 and the thereto connected operational aperture control valve WDV_3 of the converter pressure valve WDV. Given this difference in the effective areas of the surfaces 25 and 26 of the valve stem assembly WDV_S, the result is that the inlet pressure p_WD_zu of the torque converter 1, when the converter-bypass clutch is disengaged, can be controlled in a simple manner, with consideration given to the pilot pressure p_VS and the spring arrangement WDV_F of the converter pressure valve WDV.

In the diagram presented in FIG. 3, curves are shown, namely V_WDV and V_WKV, which extend into ordinate values, which are, in the given order, characteristic curves of the converter pressure valve WDV and the converter clutch valve WKV of the inventive apparatus 100, which apparatus is also depicted in FIG. 2. These curves are adjustable, because of the placement of the auxiliary pressure control valve 11 downstream of the relief aperture control valve WDV_7 of the converter pressure valve WDV. Accordingly, the valve characteristic curves V_WDV and V_WKV of, respectively again, the converter pressure valve WDV and the converter clutch valve WKV, correspond to the inlet pressures p_WD_zu and p_WK_zu of the torque converter 1 as well as the converter-bypass clutch 2.

The valve characteristic curves V_WDV and V_WKV of the converter pressure valve WDV and the converter-bypass clutch valve WKV of the inventive apparatus 100 as shown in FIG. 2 possess a deviation between a first pilot pressure p_VS_0 and a second pilot pressure p_VS_1, which is due to a pressure loss caused by flow through the hydrodynamic torque converter 1. Subsequently, the characteristic curves V_WDV and V_WKV run parallel to one another, with a buildup of pilot pressures p_VS, starting from the second pilot pressure value p_VS_1 to a third pilot pressure value of p_VS_2. At this point, the converter inlet pressure p_WD_zu of the converter spent pressure, which also serves as the inlet pressure p_WK_zu of the converter-bypass clutch 2 decrease inversely as the pilot pressure increases, whereby, under these circumstances, the flow through the converter approaches zero.

An area between a fourth pilot pressure value p_VS_3 and the third pilot pressure value p_VS_2 of the characteristic valve curves V_WDV and V_WKV is designated as the so-called "foot print area" of the torque converter 1, whereby the converter-bypass clutch 2 disengages at pilot pressures less than the third pilot pressure p_VS_2. In a case of pilot pressures greater than the fourth pressure value p_VS_2, the converter-bypass clutch 2 engages. In the range of the pilot pressure values between the pilot pressure values p_VS_2 and p_VS_3, because of the closure action of the spring arrangement 7 of the converter-bypass clutch 2, this converter-bypass clutch 2 is positioned against the housing 9, whereby, in this operational situation of the converter-bypass clutch 2, essentially no torque can be transmitted therethrough.

Only after exceeding the fourth pilot pressure value p_VS_3 can the input pressure p_WK_zu of the converter-bypass clutch 2 begin to continually increase in proportion to the pilot pressure p_VS, while the converter input pressure p_WD_zu remains, due to the auxiliary pressure control valve 11, at the predetermined value of p_0. At this occurrence, the transference capability of the converter-bypass clutch 2 rises to a maximum value.

Referring to the depiction of inventive apparatus 100 in FIG. 2, the so-called "foot print area" of the hydrodynamic torque converter 1 establishes a certain range of the pilot pressure p_VS, in which neither the input pressure p_WD_zu of the hydrodynamic torque converter 1, nor the input pressure p_WK_zu of the controlled converter-bypass clutch 2 can change. That is to say, that the "foot print area" range of the torque converter is placed in an essentially neutral position, the range of which is predetermined by the setting of the tolerances in the pilot pressure system provided for the inventive apparatus 100.

The predetermined pressure level p_0, which has been set by the auxiliary pressure control valve 11 in the line system 20 of the inventive apparatus 100, takes action is such a manner, that the air, which is in the hydraulic fluid in a dissolved form, remains in this phase and cavitation throughout the entire operational equipment of the torque converter is avoided.

The pressure level p_0 is dependent upon the disk surface area 12 as well as upon the spring tension of the spring arrangement 13, both parts of the auxiliary pressure control valve 11 in the hydraulic line system. By variation of either of these elements, changes can be made relative to the existing condition of operation of the inventive apparatus 100.

Because of the fact, that by way of the auxiliary pressure control valve 11 in the inventive apparatus 100, on the inlet side of the hydrodynamic torque converter 1, the predetermined pressure level p_0 is applied to the converter clutch piston 6 resulting in a case of a engagement converter-bypass clutch 2, the torque transfer capability of the converter-bypass clutch 2 is reduced by the same inlet pressure p_WK_zu available to the converter-bypass clutch 2, in comparison to an apparatus, by way of which, the pressure level on the inlet side of the torque converter 1 is, essentially, zero, since, with an engaged converter-bypass clutch 2, the pressure difference between the input side of the converter-bypass clutch 2 and the torque converter is reduced to about the value of the pressure level p_0. This reduction is, at least, compensated by the increase of the predetermined pressure level p_0 of the input pressure p_WK_zu of the converter-bypass clutch 2.

In the following, the method of the functioning of the inventive apparatus 100, as shown in FIG. 2, is more closely described in connection with the presentation of FIG. 3, basing the description on the first pilot pressure value, namely p_VS_0.

The first pilot pressure p_VS_0 is, in value, essentially approaching zero. In this stage of operation, the valve stem assembly WDV_S of the converter pressure valve WDV, is caused to move by way of the spring arrangement WDV_F, which acts thereon, in a direction opposite that otherwise directed by the control pressure p_VS on the valve stem assembly WDV_S. The result of this reverse movement, is that the inlet pressure p_WD_zu of the hydrodynamic torque converter 1 is at a maximum. This has the effect that the system pressure p_sys, by way of the now completely, oppositely positioned valve stem assembly WDV_S of the converter pressure valve WDV, maximally reduced, which pressure has been so adjusted by the a real difference between the pressure-responsive surfaces, namely 25 and 26, of the valve stem assembly WDV_S and the spring tension of the spring arrangement WDV_F of the converter pressure valve WDV.

Simultaneously, the relief aperture control valve WDV_7 is separated from the spent flow aperture control valve WDV_6 of the converter pressure valve WDV in its pressure controlling position, so that the spent flow of the torque converter 1 becomes immediately separated from the oil sump 28 located downstream of the auxiliary pressure control valve 11. The pressure control in the area of the operational pressure aperture control valve WDV_3 of the converter pressure valve WDV becomes realized by way of the above described modulation of the converter pressure valve WDV and exists between the supply aperture control valve WDV_2 and the inlet aperture control valve WDV_4, whereby the pressure in the area of the operational aperture control valve WDV_3 becomes greater than the predetermined pressure level p_0, established by the auxiliary pressure control valve 11.

After flowing through the hydrodynamic torque converter 1, the spent pressure p_WD_ab from the torque converter 1 becomes available to the operational aperture control valve WKV_3 and the spent flow aperture control valve WKV_5 of the converter clutch valve WKV. This corresponds, generally, to the inlet pressure p_WK_zu of the controlled converter-bypass clutch 2 as shown in FIG. 3, whereby the difference between the inlet pressure p_WD_zu of the torque converter 1 and the spent pressure p_WD_ab from the torque converter 1, that is to say, the inlet pressure p_WK_zu of the converter-bypass clutch 2 in the range between the first pilot pressure value p_VS_0 and the second pilot pressure value p_VS_1. This difference is due to pressure loss caused by the resistance of flow through the hydrodynamic torque converter 1.

The converter clutch valve WKV is completely reversed, upon the application of the first pilot pressure p_VS_0 by way of the spring arrangement WKV_F which is forcibly attached to the valve stem assembly WKV_S and the spent pressure p_WD_ab from the hydrodynamic torque converter 1, which acts in the same direction against an operational surface 15 of the valve stem assembly WKV_S of the converter clutch valve WKV. The result of this is that the supply aperture control valve WKV_4 becomes separated from the operational aperture control valve WKV_3 of the converter clutch valve WKV and the system pressure p_sys, which is present in the control line L2 of the line system 20 at the converter clutch valve WKV, cannot be applied in the direction of the controlled converter-bypass clutch 2.

Under conditions of increasing pilot pressure p_VS, both the valve stem assembly WDV_S of the converter pressure valve WDV and valve stem assembly WKV_S of the converter clutch valve WKV are slidingly displaced in such a manner, counter to, first, the force of the spring arrangements WDV_F and WKV_F, which function in compliance with the assigned spring constant thereof and are located to activate valve stem assemblies WDV_S or WKV_S and, second, counter to the spent pressure p_WD_ab from the torque converter 1, so that the input pressure p_WD_zu of the hydrodynamic torque converter 1, and therewith also the spent pressure p_WD_ab from the torque converter 1 are reduced in the manner shown in FIG. 3 to the third pilot pressure p_VS_2 by the effect of the pilot pressure p_VS, whereby the valve stem assembly WKV_S of the converter clutch valve WKV displaces itself only immediately before exceeding the pressure value p_VS_2 in the direction of the modulation control edge of the control aperture valves WKV_2 and WKV_4.

Further, the valve stem assembly WKV_S of the converter clutch valve WKV, during a period of increasing pilot pressure p_VS, is displaced, counter to the direction of the spring arrangement WKV_F, which functions in accord with its inherent spring constant, increasingly in the direction of the spring space control aperture valve WKV_6 of the converter clutch valve WKV, so that the valve stem assembly WKV_S exceeds the control edge of the supply control aperture valve WKV_4, whereby the connection with the operational control aperture WKV_3 opens.

By reaching the second pilot pressure value p_VS_1, a through-flow of the torque converter 1 is prevented by the spent-pressure of the lubrication and cooling circulation system 14, so that the valve characteristic curves. V_WDV and V_WKV of the converter pressure valve WDV and the respective converter clutch valve WKV synchronize themselves. This means, that the inflow pressure p_WD_zu of the converter pressure valve WDV and the inlet pressure p_WK_zu of the converter-bypass clutch 2 of the second pilot pressure value p_VS_1 are equal, whereby the inlet pressure p_WK_zu of the converter-bypass clutch 2 adjusts itself to the pilot pressure value from the spent pressure p_WD_ab and the pressure portion, which is allowed by the converter clutch valve WKV to communicate through the supply aperture control valve WKV_4 and through the operational control aperture valve WKV_3 pressurizingly joins the system pressure p_sys by way of the inlet line L2 on the converter clutch valve WKV.

Figure 4:
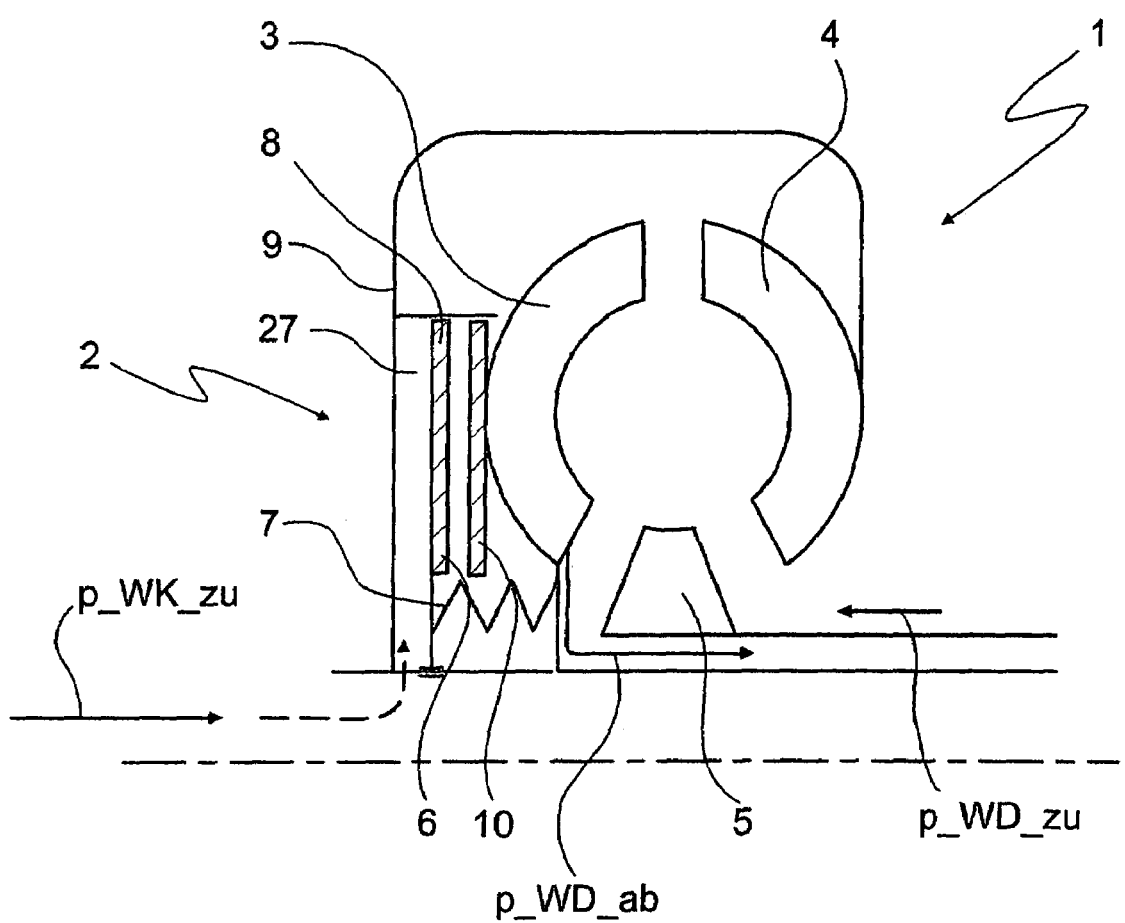
FIG. 4 is a very schematic presentation of an drive apparatus designed as a three-line converter of a drive train of a vehicle.
Figure 5:
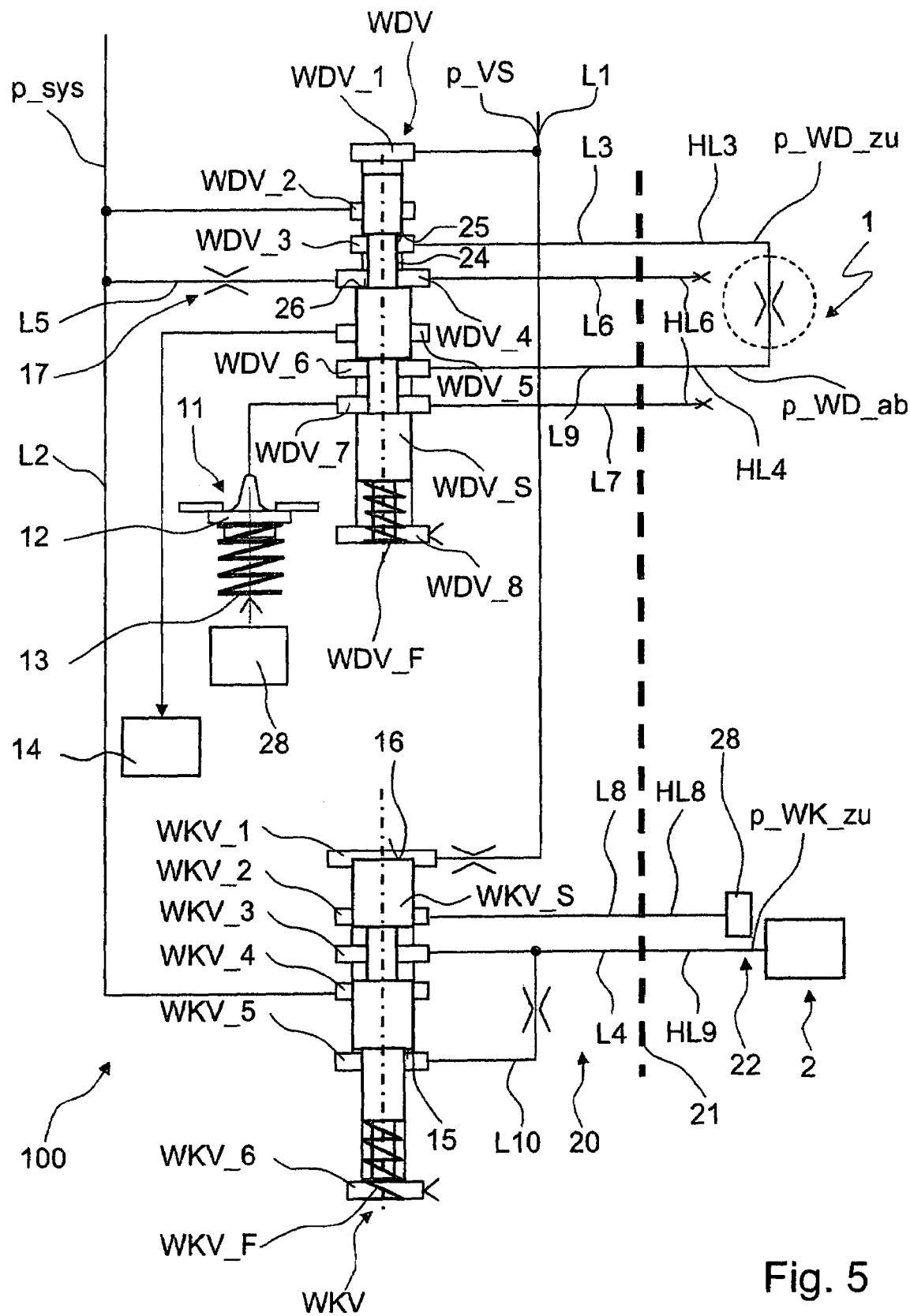
FIG. 5 is a very schematic presentation of an inventive apparatus, by way of which a three-line converter can be operated.

FIG. 4, in like manner to FIG. 1, presents a very schematic illustration of a hydrodynamic torque converter 1 having a therewith corresponding, controlled converter-bypass clutch 2, whereby the converter-bypass clutch 2 is equipped with a piston chamber 27, which chamber is enclosed separately from the interior space of the torque converter 1. The existing drive apparatus, being a so-called three-line converter, is controlled by an arrangement, which is made plain in FIG. 5, which figure shows a modification of the inventive apparatus 100. This modification of the inventive apparatus, as shown in FIG. 5, differs from that of FIG. 2, principally in the area of the hydraulic line system 22. That is to say, the difference is found in that side of the system border 21 which is remote from the converter pressure valve WDV and the converter clutch valve WKV.

In the inventive apparatus 100, as shown in FIG. 5, the spent flow of the torque converter 1 is directly connected to control line L9 of the line system 20 by way of the hydraulic line HL4 of the hydraulic line system 22. This arrangement allows that, the infeed flow of the torque converter 1 emanates from the operational control aperture valve WDV_3 of the converter pressure valve and proceeds through the following sequence of flow connections: first, the control line L3; second, the hydraulic line HL3; third, the interior of the torque converter 1; fourth, the hydraulic line HL4; fifth, the control line L9; sixth the spent flow control aperture valve WDV_6 and—with an appropriate positioning of the valve stem assembly WDV_S of the converter pressure valve WDV—; seventh, finally passes through the relief control aperture valve WDV_7 in the direction of the auxiliary flow control valve 11 without flowing through the converter clutch valve WKV as is the case for the inventive apparatus 100 as shown in FIG. 2. In this way, the flow through the torque converter 1, as adjusted in accord with FIG. 5, is principally controlled by the converter pressure valve WDV.

The converter-bypass clutch 2, as shown in the outline of the inventive apparatus 100 according to FIG. 5 is connected directly with its piston chamber. Reviewing the connections for this: starting with the supply control aperture valve WKV_4 of the converter clutch valve, an open connection to the operational control aperture valve WKV_3 of the converter clutch valve is attained by way of an appropriate valve stem positioning. Then, through the control line L4, which stands in connection with the hydraulic line HL9 of the hydraulic line system 22 in the neighborhood of the system border line 21, a connection is established directly with the piston chamber 27 of the converter-bypass clutch 2.

In the three-line converter shown in FIG. 4, the converter clutch piston 6, in common with its friction coating 8, is rotationally fixed to the housing 9 of the torque converter 1. Further, the converter clutch 6 is designed to be slidably displaceable in contact with the additional friction coating 10 to a position whereby the friction coating 10 becomes immovably affixed to the turbine rotor 3. Additionally, the converter clutch piston 6, is spring loaded by the spring arrangement 7 of the converter-bypass clutch 2 in the engagement direction of the converter-bypass clutch 2, so that for engagement of the converter-bypass clutch 2 in the piston chamber 27, an input pressure p_WK_zu of the converter-bypass clutch 2 must be applied. The force of the input pressure p_WK_zu oversteps the sum of the forces of the spring of spring arrangement 7 plus the interior pressure of the torque converter 1, since the converter clutch piston 6 is subjected to the existing hydraulic pressure in the interior of the torque converter 1 acting in the disengaging direction of the converter-bypass clutch 2.

The control line L6 and the control line L7 of the line system 20 of the inventive apparatus 100, as shown in FIG. 5, are blocked off on that side of the of the system border line 21, which is remote from the line system 20, in the area of the hydraulic line system 22. On account of this and contrary to the inventive apparatus 100 in accord with FIG. 2, the control lines L6 and L7 are designed as so-called "blind lines".

The control line L8, which is connected to the relief aperture valve WKV_2 of the converter clutch valve WKV, in the neighborhood of the system border line 21, is bound with the hydraulic line HL8, and is connected with hydraulic fluid reservoir 28 (which is not under pressure). The fluid reservoir 28 is simultaneously the oil sump of a transmission apparatus. Accordingly, when the converter clutch valve WKV is in controlled operation, an inlet pressure p_WK_zu of the converter-bypass clutch 2, which is too high, can be reduced by way of the valve stem assembly causing the opening of the connection between the operational control aperture valve WKV_3 and the relief control aperture valve WKV_2 of the converter clutch valve WKV in the direction of the non-pressurized hydraulic fluid reservoir 28.

Figure 6:
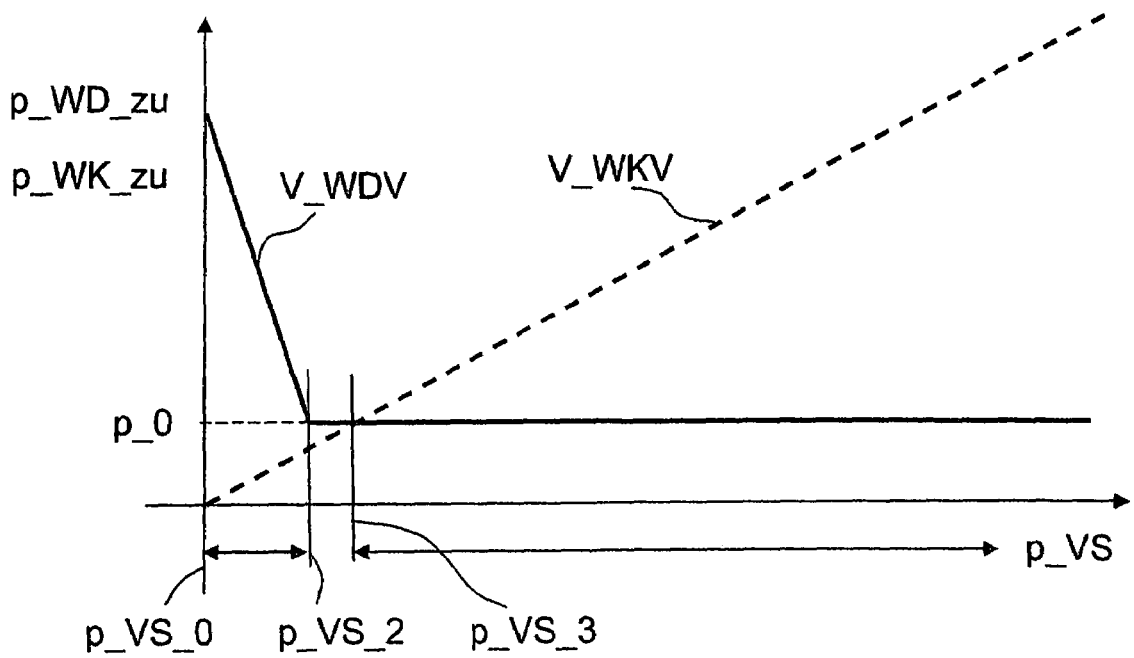
FIG. 6 is a characteristic curve for the solenoid valve and a characteristic curve of the variable pressure control valve of the inventive apparatus as presented in FIG. 5.

In FIG. 6, the characteristic curve V_WDV of the converter pressure valve WDV and the valve characteristic curve V_WKV of the converter clutch valve WKV of the apparatus 100, in accord with FIG. 5 are shown. Also illustrated in FIG. 4 are the control of the hydrodynamic torque converter 1 and the therewith corresponding converter-bypass clutch 2. In this diagram, the valve characteristic curve V_WDV of the converter pressure valve WDV of the inventive apparatus 100, as per FIG. 5, is essentially the same as the characteristic valve curve V_WDV of the converter pressure valve WDV of the inventive apparatus 100 in accord with FIG. 2, both of which lie above the control pressure p_VS.

The valve characteristic curve V_WKV of the converter clutch valve of the inventive apparatus 100 as presented by FIG. 5 differentiates itself however, in the pilot-control range between the first pilot pressure value p_VS_0 and the fourth pilot pressure value p_VS_3 of the valve characteristic curve V_WKV of the converter clutch valve WKV of the inventive apparatus 100 as presented by FIG. 2, in that the inlet pressure p_WK_zu of the converter-bypass clutch 2 at a pilot pressure value p_VS is less than the fourth pilot pressure p_VS_3, starting at a minimal pressure p_WK_zu which proportionally rises to the pilot pressure p_VS and at the fourth pilot pressure p_VS_3 exceeds the inlet pressure p_WD_zu of the torque converter 1. Upon exceeding the third pilot pressure p_VS_2 with the inlet pressure p_WD_zu, this being also the spent pressure p_WD_ab from the torque converter 1, which reaches above the value p_0 established by the auxiliary pressure control valve 11, the valve characteristic curve V_WDV of the converter pressure valve WDV possesses an unbroken continuation of curve along the pressure value p_0 as seen in FIG. 6.

The spring arrangement 7 of the converter-bypass clutch 2 enables a self-acting engagement of the converter-bypass clutch 2, even under the influence of hydrodynamic pressures in the torque converter 1, which pressures, in a known manner, vary with the speed of rotation of the torque converter 1. With the increase of the pilot pressure p_VS and the therewith accompanying increase of the inlet pressure p_WK_zu of the converter-bypass clutch 2, the converter-bypass clutch 2 increasingly engages, whereby the converter-bypass clutch 2 becomes finally fully engaged at a pressure of p_VS_3 and the torque can be directed through the converter-bypass clutch 2. As the pilot pressure p_VS increases, the transmission capability of the converter-bypass clutch 2 likewise becomes greater up to the point where it is carrying the full transmission capability thereto assigned.

In the operation of the inventive apparatus 100 in accord with FIG. 2, as well as in the functioning of the inventive apparatus 100 in accord with FIG. 5, the auxiliary pressure control valve 11 reduces pressure in the interior of the torque converter 1 to a predetermined level, in other words, the presence of the pressure level p_0 is thereby prevented. Simultaneously, in both apparatuses, a minimum flow of hydraulic fluid through the torque converter 1 is established while the converter-bypass clutch 2 is engaged. The reason for this is to enable diversion, in a simple manner, of the generation of heat by long-continued converter slippage or diminish such heat as arises after the completion of an adjustment period in the neighborhood of the torque converter 1.

At this point, regarding both inventive apparatuses 100, the respective operational control aperture valve WDV_3 of the converter pressure valve WDV, is connected by way of a throttle-like functioning torque converter 1 with the lubrication and cooling circulation system 14 of a transmission device, which is part of the so-called secondary circulation system of the system pressure.

Fundamentally, the flow through the torque converter 1 arises from the pressure level in the lubrication and cooling circulation system 14, that is to say, in the secondary system circuit, the throttling action of the torque converter 1 and the pressure level of the auxiliary pressure controlling valve 11, whereby the hydraulic fluid flow through the torque converter 1, upon an appropriate positioning of the valve stem WDV_S of the converter pressure valve WDV is diverted through the auxiliary pressure control valve 11 into the non-pressurized hydraulic reservoir 28, i.e., this being the transmission sump.

When the converter-bypass clutch 2 is disengaged, a predominately greater through-flow is established by the torque converter through the converter pressure valve WDV by an increased pressure level in relation to the existing pilot pressure p_VS_0 and in this case also the converter-bypass clutch 2. This increased flow through the torque converter 1 is then directed for the purpose of reducing the production of a (not further described) hydraulic pump, by way of which the system pressure p_sys is kept at its desired level and the produced pump flow is made available directly to the circulation systems for cooling and lubrication of the transmission.

The inventive apparatus, which is employed both for the operation of a so-called three-line converter as well as for the operation of a so-called two-line converter, is enabled by way of appropriate connections of the control lines of the line system of the apparatus to connect to hydraulic systems, which are separate from one another or by way of appropriate shifting equipment variants, such as, for instance, in the area of interposed vanes.

These methods of functioning, offer, in an advantageous manner, the possibility to assemble hydraulic controls for transmissions, which are standardized at least in particular areas, and which, in comparison to conventional hydraulic controls can be manufactured at a more economical cost.

REFERENCE NUMERALS

1 hydrodynamic torque converter
2 controlled converter-bypass clutch
3 turbine rotor
4 pump rotor
5 stator
6 converter clutch piston
7 spring arrangement of converter-bypass clutch
8 first friction overlay
9 housing
10 second friction overlay
11 pressure control valve
12 valve disk
13 spring arrangement of pressure control valve
14 lubrication and cooling oil circulation system
15 pressure-reactant surface
16 end face of valve stem assembly of the converter clutch valve
17 throttle
20 line system (piping/tubing system for fluids)
21 border limit of inventive apparatus
22 hydraulic line system
24 control space
25,26 reactant surface of the valve stem assembly of the converter pressure valve
27 piston chamber
28 hydraulic fluid reservoir
100 inventive apparatus
HL3, HL4, HL6, HL8,
HL9 hydraulic lines
L1 to L10 control lines
p_sys system pressure
p_VS pilot pressure
p_VS_0 to
p_VS_4 value of specific pilot pressures
p_WD_zu inlet pressure of torque converter
p_WD_ab outlet (spent) pressure of torque converter
p_WK_zu inlet pressure of the converter-bypass clutch
V_WDV curves
V_WKV curves
WDV converter pressure valve
WDV_1 to
WDV_8 control aperture valves
WDV_F spring arrangement
WDV_S valve stem assembly
WKV converter clutch valve
WKV_1 to
WKV_6 control aperture valves
WKV_F spring arrangement
WKV_S valve stem assembly

The invention claimed is:

1. An apparatus (100) for operating a hydrodynamic torque converter (1) end a converter-bypass clutch (2) of a transmission apparatus, the apparatus comprising: a first line system (20) having a solenoid valve (WDV) and a variable pressure control valve (WKV), a valve stem assembly (WDV_S) of the solenoid valve (WDV) and a valve stem assembly (WKV_S) of the pressure control valve (WKV) being biased by a controllable pilot pressure (p_VS) counter to a spring arrangement (WDV_F, WKV_F), each of the solenoid valve (WDV) and the pressure control valve (WKV) having a plurality of control lines (L1 to L10) connected to control apertures (WDV_1 to WDV_8 and respectively WKV_1 to WKV_6), the control apertures connect to hydraulic lines (HL3, HL4, HL6, HL8, HL9) of a hydraulic line system (22) for subjecting the torque converter (1) and the converter-bypass clutch (2) to hydraulic fluid from an area of remote ends of the control apertures (WDV_1 to WDV_8 WKV_1 to WKV_6) to an inlet and an outlet side of the torque converter (1) as well as to a piston chamber (27) of the converter-bypass clutch (2), the inlet and the outlet sides of the torque converter (1) only directly communicate with the solenoid valve (WDV), the piston chamber (27) of the converter by-pass clutch (2) is separated from a spent flow of the torque converter (1), and the spent flow of the torque converter (1) is directly connected to a spent flow control aperture (WDV_6) of the solenoid valve (WDV) via a hydraulic line system (22).

2. The apparatus according to claim 1, wherein a first control line (L6) of the line system (20) is connected to an input feed control aperture (WDV_4) of the solenoid valve (WDV), the solenoid valve (WDV) is subjected to a pressure of the piston chamber of the converter-bypass clutch (2), which contains the spent flow of hydraulic fluid from the torque converter (1), which has been directed thereto through the hydraulic line system (22) which has a relief control aperture (WDV_7) of the solenoid valve (WDV) and is blocked by the spent flow of the torque converter (1), and the spent flow of the torque converter (1) is separated from the hydraulic line system (22) in piston chamber of the torque converter (1).

3. The apparatus according to claim 2, wherein the input feed control aperture (WDV_4) of the solenoid valve (WDV), by a position of the valve stem assembly (WDV_S) of the solenoid valve (WDV), the connection between a relief control aperture (WDV_2) and an operational control aperture (WDV_3) of the solenoid valve (WDV) is blocked and, upon a simultaneous valve stem blocking operation, the connection of the spent flow control aperture (WDV_6) of the solenoid valve (WDV) is shut off such that the relief aperture (WDV_7) of the solenoid valve (WDV) is connection with the spent flow control aperture (WDV_6) of the solenoid valve (WDV).

4. The apparatus according to claim 2, wherein a second control line (L7) in the line system (20) is connected to the input control aperture (WDV_4) of the solenoid valve (WDV) is blocked by way of the piston chamber (27), and the piston chamber (27) is separated from the spent flow from the torque converter (1) of the converter-bypass clutch (2) in the area of the hydraulic line system (22).

5. The apparatus according to claim 1, wherein an operational control aperture (WKV_3) of the variable pressure control valve (WKV) is connected with a spent flow aperture (WKV_5) of the pressure control valve (WKV) via the line system (20) such that a pressure is applied on the valve stem (WKV_S) of the pressure control valve (WKV), the pressure applied on the valve stem (WKV_S) of the pressure control valve (WKV) is counter to the pilot pressure (p_VS) applied on the valve stem (WKV_S) of the pressure control valve (WKV) via a pilot pressure control aperture (WKV_1) of the variable pressure valve (WKV).

6. The apparatus according to claim 1, wherein, an operational aperture (WKV_3) of the variable pressure control valve (WKV) communicates with a relief control aperture (WKV_2) of the variable pressure control valve (WKV) when communication between an inlet feed control (WKV_4) of the variable pressure control valve (WKV) and the operational aperture (WKV_3) of the variable pressure control valve (WKV) is blocked by the valve stem assembly (WKV_S) of the pressure control valve (WKV).

7. The apparatus according to claim 6, wherein the communication between the operational aperture (WKV_3) of the variable pressure control valve (WKV) and the relief control aperture (WKV_2) of the variable pressure control valve (WKV) is blocked by way of the valve stem (WKV_S) of the variable pressure control valve (WKV) when a position of the valve stem assembly (WKVS) of the pressure control valve (WKV) enables communication between the inlet feed aperture (WKV_4) of the variable pressure control valve (WKV) and the operational aperture (WKV_3) of the variable pressure control valve (WKV).

8. An apparatus (100) for operating a hydrodynamic torque converter (1) and a converter-bypass clutch (2) of a transmission apparatus, the apparatus comprising: a first line system (20) having a solenoid valve (WDV) and a variable pressure control valve (WKV), a valve stem assembly (WDV_S) of the solenoid valve (WDV) and a valve stem assembly (WKV_S) of the pressure control valve (WKV) being biased by a controllable pilot pressure (p_VS) counter to a spring arrangement (WDV_F, WKV_F), each of the solenoid valve (WDV) and the pressure control valve (WKV) having a plurality of control lines (L1 to L10) connected to control apertures (WDV_1 to WDV_8 and respectively WKV_1 to WKV_6), the control apertures connect to hydraulic lines (HL3, HL4, HL6, HL8, HL9) of a hydraulic line system (22) for subjecting the torque converter (1) and the converter-bypass clutch (2) to hydraulic fluid from an area of remote ends of the control apertures (WDV_1 to WDV_8, WKV_1 to WKV_6) to an inlet and an outlet side of the torque converter (1) as well as to a piston chamber (27) of the converter-bypass clutch (2), by way of the piston chamber (27) of the converter-bypass clutch (2), the converter-bypass clutch (2) being pressurized by a spent flow of hydraulic fluid from the torque converter (1)

through the hydraulic line system (22) using an operational control aperture (WKV_3) of the pressure control valve (WKV) and an internally thereto connected relief control aperture (WDV_2) of the pressure control valve (WDV) having a spent flow control aperture (WDV_6) of the solenoid valve (WDV) and by way of the piston chamber (27), separate from the spent flow of the torque converter (1) and the spent flow of the torque converter (1) directly connecting the spent flow control aperture (WDV_6) of the solenoid valve (WDV) via the hydraulic line system (22), a control line (L8) of the line system (20) communicates with a hydraulic fluid reservoir (28) via the hydraulic line system (22) and effected by a relief control aperture (WKV_2) of the pressure control valve (WKV), the pressure control valve (WKV) communicates with the piston chamber (27) of the converter-bypass dutch (2) and the piston chamber (27) is separated from the spent flow of the torque converter (1).

9. The apparatus according to claim 8, wherein a relief aperture valve (WDV_7) of the solenoid valve (WDV) communicates with the hydraulic fluid reservoir (28), an auxiliary pressure control valve (11), located between the relief aperture (WDV_7) and the hydraulic fluid reservoir (28), adjusts a minimal pressure in the torque converter (1).

10. An apparatus (100) for operating a hydrodynamic torque converter (1) and a converter-bypass clutch (2) of a transmission apparatus, the apparatus comprising; a first line system (20) having a solenoid valve (WDV) and a variable pressure control valve (WKV) a valve stem assembly (WDV_S) of the solenoid valve (WDV) and a valve stem assembly (WKV_S) of the pressure control valve (WKV) being biased by a controllable pilot pressure (p_VS) counter to a Spring arrangement (WDV_F, WKV_F), each of the solenoid valve (WDV) and the pressure control valve (WKV) having a plurality of control lines (L1 to L10) connected to control apertures (WDV_1 to WDV_8 and respectively WKV_1 to WKV_6), the control apertures connect to hydraulic lines (HL3, HL4, HL6, HL8, HL9) of a hydraulic line system (22) for subjecting the torque converter (1) and the converter-bypass clutch (2) to hydraulic fluid from an area of remote ends of the control apertures (WDV_1 to WDV_8, WKV_1 to WKV_6) to an inlet and an outlet side of the torque converter (1) as well as to a piston chamber (27) of the converter-bypass clutch (2), by way of the piston chamber (27) of the converter-bypass clutch (2), the converter-bypass clutch (2) being pressurized by a spent flow of hydraulic fluid from the torque converter (1) through the hydraulic line system (22) using an operational control aperture (WKV_3) of the pressure control valve (WKV) and an internally thereto connected relief control aperture (WDV_2) of the pressure control valve (WDV) having a spent flow control aperture (WDV_6) of the solenoid valve (WDV) and by way of the piston chamber (27), separated from the spent flow of the torque converter (1), and the spent flow of the torque converter (1) directly connecting the spent flow control aperture (WDV_6) of the solenoid valve (WDV) via the hydraulic line system (22), the solenoid valve (WDV) has a lubrication and cooling control aperture (WDV_5) which supplies a lubrication and cooling oil circulation system (14) of the transmission apparatus, the lubrication and cooling oil circulation system (14) is located downstream of the solenoid valve (WDV), and the cooling control aperture (WDV_5) of the solenoid valve (WDV) communicates with the lubrication and cooling circulation system (14) via the line system (20).

11. The apparatus according to claim 10, wherein the spent flow control aperture (WDV_6) of the solenoid valve (WDV) communicates with a relief control aperture (WDV_7) of the solenoid valve (WDV) when, because of a position of the valve stem assembly (WDV_S) of the solenoid valve (WDV), the communication between the relief control aperture (WDV_2) of the solenoid valve (WDV) and operational aperture (WDV_3) of the solenoid valve (WDV) is blocked, and the spent flow control aperture (WDV_6) of the solenoid valve (WDV) communicates with the cooling control aperture (WDV_5) when, because of a position of the valve stem assembly (WDV_S) of the solenoid valve (WDV), the communication between the relief control aperture (WDV_2) of the solenoid valve (WDV) and the operational aperture valve (WDV_3) of the solenoid valve (WDV) is open.

* * * * *